M. CHASE.
Sewing Machine.
No. 105,548.
Patented July 19, 1870.
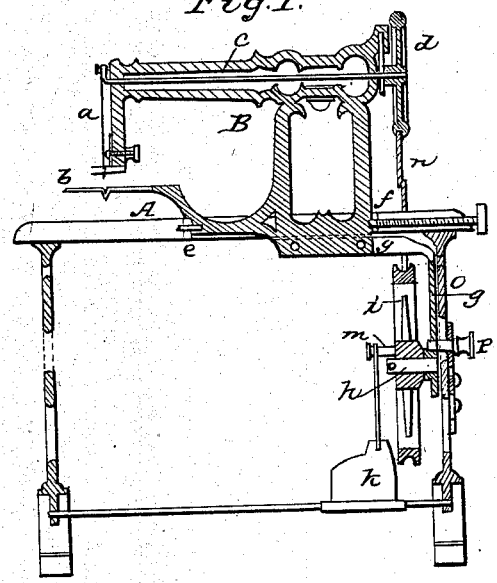
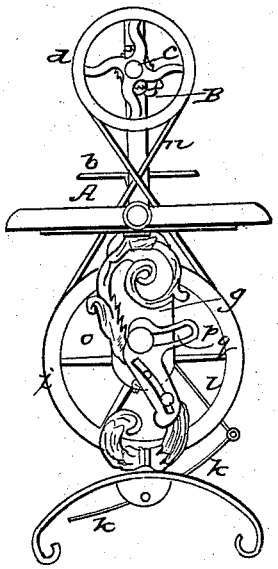
witnesses
J. N. Piper
L. N. Miller
Inventor
Milton Chase
by his attorney
R. H. Eddy

United States Patent Office.

MILTON CHASE, OF HAVERHILL, ASSIGNOR TO HIMSELF AND HORACE CHASE, OF BOSTON, MASSACHUSETTS.

Letters Patent No. 105,548, dated July 19, 1870.

IMPROVEMENT IN SEWING-MACHINE AND ITS SUPPORTING-TABLE.

The Schedule referred to in these Letters Patent and making part of the same.

*To all persons to whom these presents may come:*

Be it known that I, MILTON CHASE, of Haverhill, of the county of Essex and State of Massachusetts, have made a new and useful invention, having reference to Sewing-Machines and the Tables thereof; and do hereby declare the same to be fully described in the following specification and represented in the accompanying drawing, of which—

Figure 1 is a longitudinal section, and

Figure 2, an end elevation of a sewing-machine and its supporting table and the driving-wheel applied in accordance with my invention.

The main object or purpose of such invention is to enable the sewing-machine, while the table is stationary, to be inclined into an acute angle with the table top, thereby, at the same time, inclining the bed-plate for supporting the material to be sewed.

The machine and the table are to have a clamping device or mechanism by which the machine may be fixed either in an upright position or in an inclined one, as occasion may require.

The object of so inclining the machine is to enable an attendant to operate or guide, with greater convenience and less fatigue comparatively, the material while being sewed than would result were the bed-plate of the machine to be maintained horizontal.

Another object of having the machine capable of being inclined relatively to the table top is that it enables articles placed on the latter to retain their normal position when the machine is inclined, or while it may be in the act of being so. If the machine be fixed to the table top so that to incline the former, the latter has to be inclined with it, it will readily be seen that articles when on the table would be liable to roll or fall therefrom, or while the top may be inclined.

I am aware that a sewing-machine table has been made with its top pivoted to its body, and having the pivots arranged in coincidence or line with the axis of motion of the main driving-shaft of the machine, such being the invention of Michael J. Kerigan, for which he has applied for a patent. I make no claim to such; the nature of my invention consisting mainly in a sewing-machine and its table, so pivoted or applied together, and arranged in manner as hereinafter described, as to enable the sewing-machine to be moved into and fixed at one or more inclined positions relatively to the table top.

In the drawing—

A denotes the table, and

B, a common chain-stitch sewing-machine applied thereto in accordance with my invention.

The needle of the machine is shown at *a*, the bed-plate at *b*, the driving-shaft at *c*, and its driving-pulley or wheel at *d*.

The machine is pivoted to the table-top, as shown at *e f*, and from such machine an arm, *g*, extends downward beneath the table top, and supports the pivot or journal *h* of the driving fly-wheel *i*.

The pedal *k* has a connecting-rod, *l*, jointed to it and the wrist or crank *m* of the driving fly-wheel.

A crossed endless band, *n*, is extended about the periphery of the two wheels *i* and *d*.

There projects from one side or standard, *o*, of the table a slotted arm, *p*.

A clamp-screw, *r*, suitably applied to such arm and in its slot *q*, serves to clamp the arm *g* in position, and thereby hold or fix in place the sewing-machine, when either upright or inclined, as the case may be.

From the above it will be seen that the fly-wheel will move or swing with the sewing-machine, but in the opposite direction, while the latter (viz., the machine) may be in the act of being put or moved into an inclined position.

The center from which the slot *q* is carried is coincident with the pivotal axis of the sewing-machine, the table top being cut out or away, so as to admit of the necessary movements, as described, of the machine and the driving-belt or band.

The pivots of the machine may be so applied to the table as to be movable and adjustable vertically with respect to it, in order to effect the tightening of the band, or for any other purpose.

I make no claim to anything described in either of the United States patents 58,366 and 97,481.

I claim as my invention—

A sewing-machine and its table, as arranged and pivoted together in manner as described and represented, so as to enable the sewing-machine to be moved and set into one or more inclined positions relatively to the table-top, substantially as and for the purpose as described.

Also, in combination with a sewing-machine and its table, so pivoted or applied together, the main driving fly-wheel, as applied to swing with the machine while being moved on its pivots, the whole being substantially as explained.

Also, in combination with a sewing-machine and table pivoted together, as and for the purpose set forth, and having the driving fly-wheel arranged to swing with the machine as and while being inclined, as described, a mechanism or means for clamping to the table the machine when in either of its positions, as explained.

MILTON CHASE.

Witnesses:
R. H. EDDY,
J. R. SNOW.